US008756647B2

(12) United States Patent
de Leeuw

(10) Patent No.: US 8,756,647 B2
(45) Date of Patent: Jun. 17, 2014

(54) LNB CONTROL CIRCUIT THAT PROVIDES POWER AND CONTROL COMMANDS

(75) Inventor: Herman J. J. de Leeuw, Almelo (NL)

(73) Assignee: EchoStar Global B.V., Almelo (NL)

( * ) Notice: Subject to any disclaimer, the term of this patent is extended or adjusted under 35 U.S.C. 154(b) by 1242 days.

(21) Appl. No.: 12/210,889

(22) Filed: Sep. 15, 2008

(65) Prior Publication Data

US 2010/0071023 A1 Mar. 18, 2010

(51) Int. Cl.
*H04N 7/16* (2011.01)

(52) U.S. Cl.
USPC ........... 725/151; 330/227; 327/308; 455/334; 725/63; 725/68; 725/127

(58) Field of Classification Search
USPC ......... 725/63, 68, 127, 151; 455/334; 330/51, 330/251, 277, 297; 327/308
See application file for complete search history.

(56) References Cited

U.S. PATENT DOCUMENTS

| | | | | |
|---|---|---|---|---|
| 6,144,259 | A * | 11/2000 | Kirisawa | 330/296 |
| 2004/0093617 | A1* | 5/2004 | Horr et al. | 725/71 |
| 2005/0128004 | A1* | 6/2005 | Woodford | 330/297 |
| 2005/0130582 | A1* | 6/2005 | Woodford | 455/3.02 |
| 2005/0289632 | A1* | 12/2005 | Brooks et al. | 725/126 |
| 2008/0049489 | A1* | 2/2008 | Johnson | 365/158 |
| 2009/0124229 | A1* | 5/2009 | Fitzpatrick | 455/334 |

FOREIGN PATENT DOCUMENTS

| | | |
|---|---|---|
| WO | WO 2007/040573 | 4/2007 |
| WO | WO 2008/091255 | 7/2008 |

OTHER PUBLICATIONS

European Search Report and Written Opinion dated May 13, 2011, EP 2164192 A3, 6 pages.

* cited by examiner

*Primary Examiner* — Brian T Pendleton
*Assistant Examiner* — Alan Luong
(74) *Attorney, Agent, or Firm* — Seed IP Law Group PLLC

(57) ABSTRACT

One embodiment may take the form of a control circuit that provides a combined power signal and control signal to an LNB of a satellite system. The control circuit output may be transmitted to an LNB by a set-top box (STB) such that the STB may control the LNB. The control circuit may accept an enable signal from the STB to alter the circuit from a transmitting circuit to a receiving circuit. The control circuit may also integrate the functionality of a low pass filter into the communication signal circuit, thereby removing the need for a low pass filter at a power supply output. The control circuit may also provide a low overall power consumption of the circuit by isolating the communication signal from the power supply signal before the signals are combined.

19 Claims, 3 Drawing Sheets

LNB CONTROL CIRCUIT THAT PROVIDES POWER AND CONTROL COMMANDS

TECHNICAL FIELD

The present invention relates generally to an electrically-powered devices, and more particularly to a low noise block control circuit that may provide power and control commands to an LNB.

BACKGROUND

Satellite television systems are commonplace in today's households. Generally, such systems provide a television signal to a user from an orbiting satellite. The television signal may then be collected by a parabolic satellite dish or dishes located near the user. Once collected, the signal may be transmitted to a set-top box (STB) that translates and provides the received signal to a user's television such that the user's television may recognize and display a television program to the user.

To receive the transmitted television signal, the satellite dish may include a low noise block (LNB) device. The LNB may act as the antenna of the satellite dish by collecting the transmitted television signal and providing that signal to an STB. Further, because satellites generally use a high frequency signal when transmitting the television signal, the LNB may also convert the signal into a lower frequency and amplify the signal before transmitting the signal to the STB. By converting the signal into a lower frequency, the signal may be transmitted across a cable that may connect the STB and the LNB with less loss.

In addition to carrying the converted television signal, the cable connecting the STB and the LNB may also carry power and communication signals. These signals may be transmitted from the STB to the LNB through the cable. The power and communication signals sent from the STB to the LNB may be used to control one or several LNBs. For example, in a satellite television system utilizing more than one LNB, the STB may provide signals to the LNBs to switch from one LNB to another in response to an input provided by the user. Thus, as the user instructs the STB to change a channel, the STB may provide signals to switch from a first LNB and to a second LNB to access the requested channel. In this manner, the STB may supply power to the LNB as well as provide communication signals to the LNB to control the LNB device. Such signals may be provided to the LNB through an LNB control circuit.

BRIEF SUMMARY

A first embodiment may take the form of a control circuit. The control circuit may comprise an inductor electrically connected to a first node and a first capacitor electrically connected between the first node and ground. The circuit may also comprise a second capacitor electrically connected between the first node and a second node, a first resistor electrically connected to the second node and a field effect transistor (FET). The FET may comprise a source terminal electrically connected to the first resistor and a base terminal and a drain terminal electrically connected to ground.

A second embodiment may take the form of an apparatus for controlling a low noise block. The apparatus may include an RF splitter coupled to the low noise block and a control circuit coupled to the RF splitter. The control circuit may comprise a power signal input pin, a control signal input pin, an output pin and an enable signal input pin coupled to a field effect transistor. The field effect transistor may be configured to control the impedance level at the output pin. Further, the RF splitter may be coupled to the control circuit at the output pin of the control circuit.

A third embodiment may take the form of a method for communicating with a low noise block. The method may comprise the operations of inputting a power signal to a control circuit, inputting a control signal to the control circuit and inputting a high transistor-transistor level (TTL) enable signal to a base terminal of a field-effect transistor device that is a component of the control circuit. The method may also include the operation of outputting a combined power and control signal to the low noise block.

DETAILED DESCRIPTION

One embodiment may take the form of a control circuit that provides a combined power signal and control signal to an LNB of a satellite system. The control circuit output may be transmitted to an LNB by a set-top box (STB) such that the STB may control the LNB. The control circuit may accept an enable signal from the STB to alter the circuit from a transmitting circuit to a receiving circuit. The control circuit may also integrate the functionality of a low pass filter into the communication signal circuit, thereby removing the need for a low pass filter at a power supply output. The control circuit may also lower the overall power consumption for the circuit by isolating the communication signal from the power supply signal before the signals are combined. Through the circuit, the STB may power and control the LNB of the satellite system.

Figure 1:
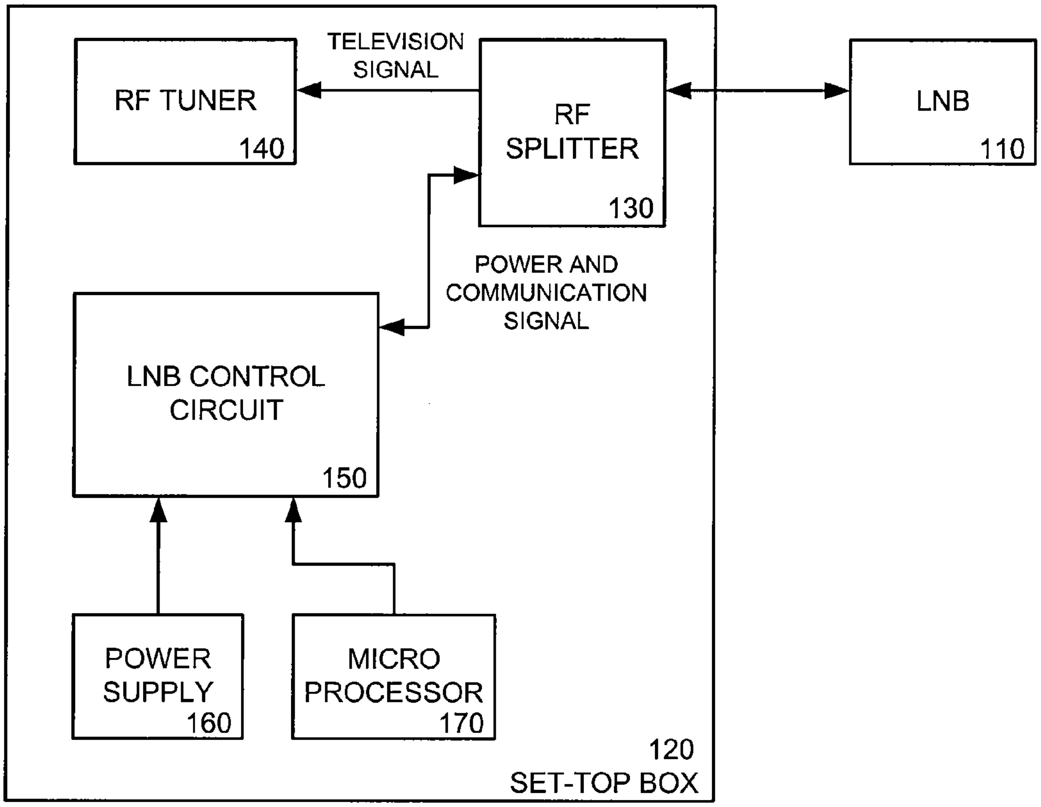
FIG. 1 depicts a block diagram of an arrangement of some components of an STB and an LNB of a satellite television system.

FIG. 1 depicts a block diagram of an arrangement of some components of an STB and an LNB of a satellite television system. The television system may receive a transmitted television signal and translate the signal such that a user's television may recognize and display a television program to the user.

The television signal may be collected by the LNB 110 and transmitted to the STB 120. The collected signal may be transmitted to the STB 120 over a cable, such as a coaxial cable. As described above, the LNB may convert the signal into a lower frequency and amplify the signal before transmitting the signal to the STB 120. The transmitted signal may be received at the STB 120 by an RF splitter 130. The RF splitter 130 may split the incoming signal, sending the RF television signal to an RF tuner 140 and an LF communication signal to the LNB control circuit 150. The RF tuner 140 may utilize the incoming television signal to provide the user's television with a recognizable television signal. The LNB control circuit 150 may utilize the incoming communication signal to communicate and control the LNB 110.

As explained in more detail below, the LNB control circuit 150 may provide a power and communication signal to control the LNB 110. The LNB control circuit 150 may accept the power signal from a power supply 160 and the communication signal from a micro processor 170. Alternatively, the power supply 160 and the micro processor 170 may be a part of the LNB control circuit 150. Regardless, the LNB control circuit 150 may provide a combined power and communication signal to the LNB 110 through the RF splitter 130 of the STB 120. The combined power and communication signal may provide power to the LNB 110 as well as a communication signal to control the LNB. Thus, the LNB 110 may be controlled by the STB 120 by utilizing the LNB control circuit 150.

Figure 2:
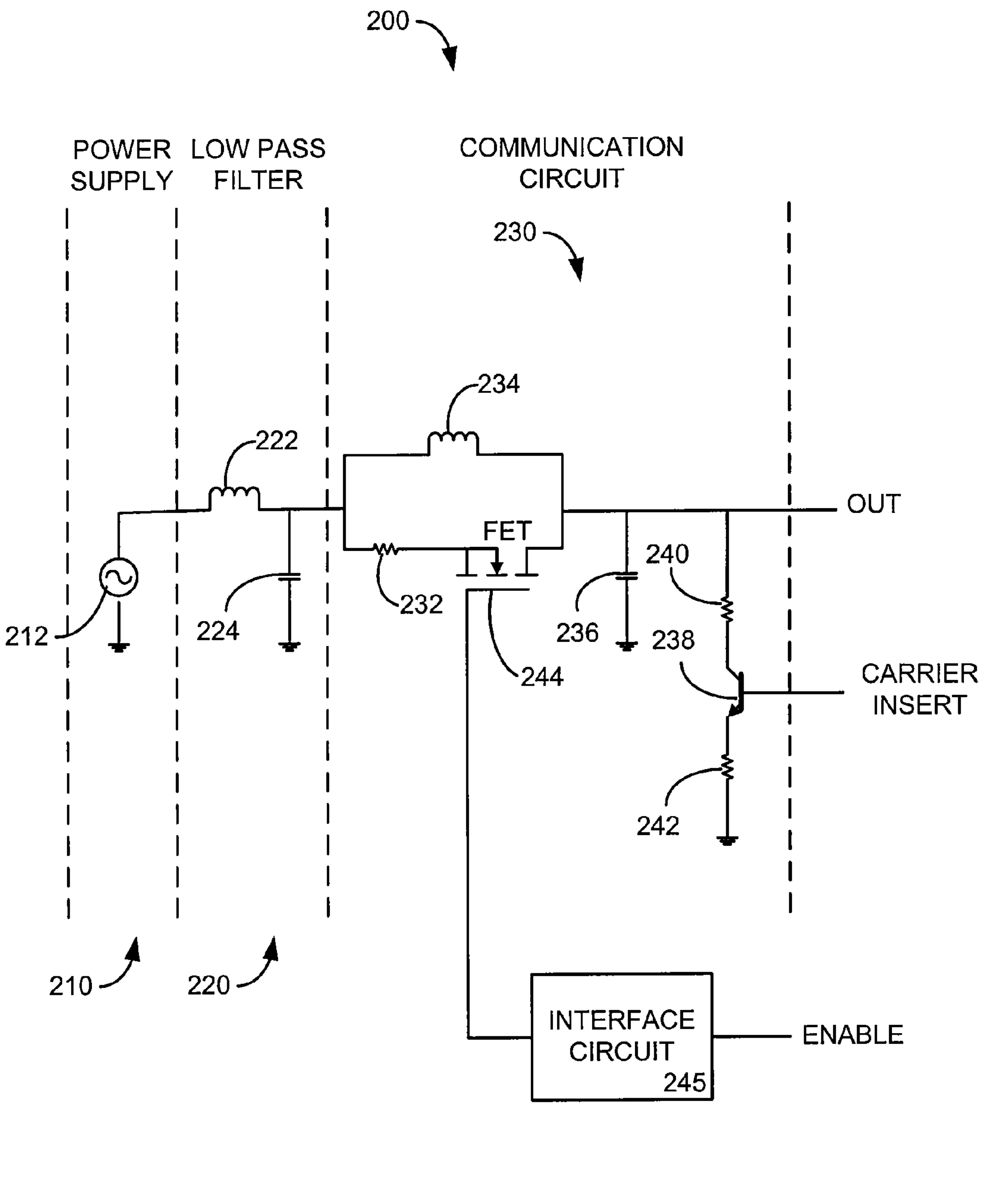
PRIOR ART Fig. 2
FIG. 2 depicts a prior art LNB control circuit, including a power supply circuit, a low pass filter circuit and a communication circuit to provide power and control signals to an LNB.

FIG. 2 depicts a prior art LNB control circuit 200, including a power supply circuit 210, a low pass filter circuit 220 and a communication circuit 230. The control circuit 200 of FIG. 2 may be located within an STB and may provide a power signal to the LNB. Further, the communication circuit 230 may combine a control signal with the power signal to transmit to the LNB, such that the STB may both power and control the LNB.

The power supply circuit 210 may include a power supply 212. The power supply 212 may be used by the control circuit 200 to provide power to the LNB through a cable connecting the STB to the LNB. Generally, the power supply 212 may be a switch mode converter that generates 13 or 18 volts DC. However, some drawbacks may exist with a switch mode converter power supply. For example, the converter may cause switching noise at the power supply output that may be undesirable in certain circuits. To remove the switching noise caused by the converter, a low pass filter is commonly used at the power supply output to filter out the switching noise.

The low pass filter circuit 220 may include an inductor 222 and a capacitor 224 electrically connected in series. The inductor 222 and capacitor 224 may act on the output of the switch mode converter power supply as a low pass filter to filter out the noise caused by the switching of the switch mode converter power supply.

The communication circuit 130 may receive a control instruction from the STB and combine it with the power signal generated by the power circuit 210 for transmission to the LNB. The control instruction may be generated by the STB and may be input to the circuit at the carrier insert input pin. The first resistor 232, the inductor 234 and the capacitor 236 of the communication circuit may form an RLC damped resonant circuit to remove harmonics from the control instruction signal on the carrier insert pin. The transistor 238, the second resistor 240 and the third resistor 242 may shift the voltage level of the incoming control instruction signal to the voltage of the power circuit 210. Thus, at the output pin, the control circuit 200 may provide a combined power signal and communication signal to the LNB.

A field-effect transistor (FET) device 244 may be included in the control circuit 200 and electrically connected in series with the first resistor 232. The FET device 244 may operate as a switch in the control circuit 200 and may be controlled by an enable input. The FET device 244 may allow the circuit to change electrical impedance at the output. For example, a low impedance at the output pin may be achieved when the FET device 244 is conducting. The high impedance at the output pin may be achieved when the FET device 244 is not conducting. The enable signal that controls the FET device 244 may be provided by a microprocessor within the STB. However, because the FET device 244 in the control circuit 200 is electrically connected to the power supply 212, a low voltage digital signal to control the FET device 244 may be adapted via an interface circuit 245 to raise the input voltage of the FET device to match that of the power supply 212. Thus, the control circuit 200 may use an additional interface circuit 245 at the enable pin input to increase the voltage of the enable signal.

Figure 3:
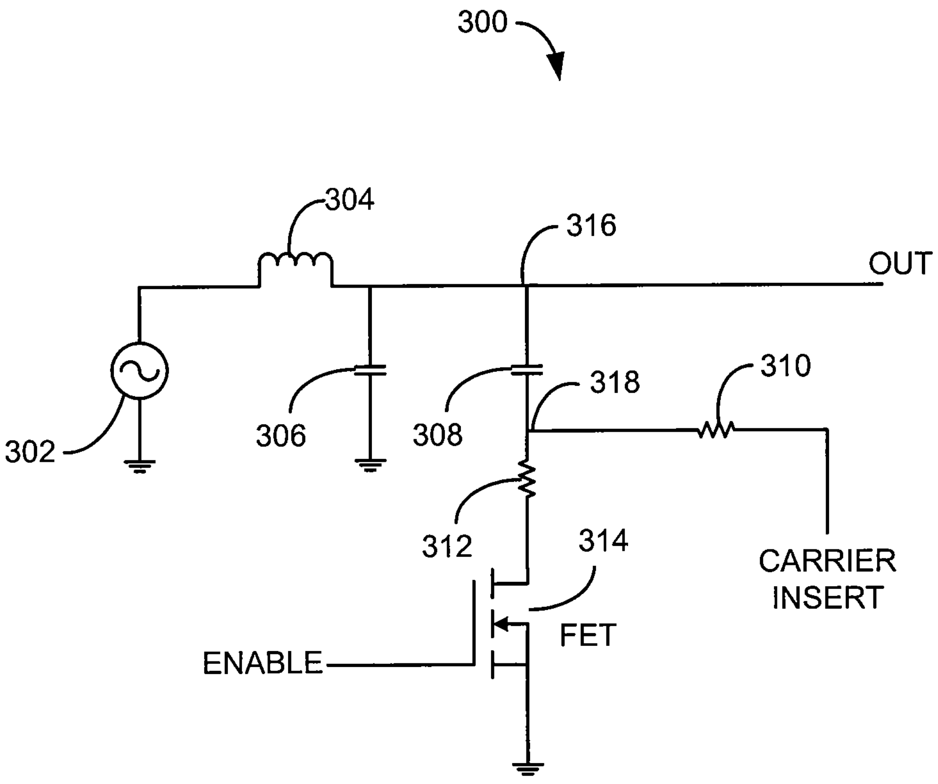
FIG. 3 depicts one embodiment of the present disclosure for a control circuit to provide power and control signals to an LNB device.

FIG. 3 depicts one embodiment for a control circuit to provide power and control signals to an LNB device. The control circuit 300 may be located within a STB and may communicate with the LNB over a cable that connects the STB and the LNB. Alternatively, the control circuit 300 may be a separate module from the STB located between the STB and the LNB. However, such a configuration may utilize several connections between the control circuit 300 and the STB to provide the control circuit with the control and power signals. The power signal and communication signal may be combined by the control circuit 300 and may be transmitted to the LNB over this cable.

A power supply 302 may be connected to the embodiment circuit to provide power to the LNB. The power supply 302 depicted in FIG. 3 merely represents a power supply signal connected to the embodiment. In practice, the power signal may come from any power source. For example, the power supply may be a switched mode power supply connected directly to the control circuit 300. Alternatively, the power supply 302 may be supplied by a power circuit that modifies the power signal to meet the specifications of the control circuit. Generally, the power supply 302 may be any power signal that may be used by the STB to power the LNB. However, a typical power supply signal to power an LNB may range from 13 to 18 volts DC.

One terminal of an inductor 304 may be electrically connected to the power supply 302 and the other terminal of the inductor 304 may be electrically connected to a first node 316. In addition to the inductor 304, a first capacitor 306 may also be operably connected to the first node 316. The first capacitor 306 may also be connected on the other end to ground. The inductor 304 may be any electrical device that can store energy and resist current shifts. The first capacitor 306 may be any electrical device that can store electrical energy.

Among other functions, the inductor 304 and the first capacitor 306 may act as a low pass filter for the incoming power supply signal. A low pass filter is an electronic circuit that passes low-frequency signals but attenuates high-frequency signals past a cutoff frequency. The cutoff frequency may be set by the values selected for the components that make up the low pass filter. The low pass filter function of the embodiment may filter out high frequency noise caused by the switching of the power supply 302, called switching ripple. In some circuits, switching ripple may be undesirable within the power signal. Thus, a low pass filter may be used to filter out the switching ripple. While shown as comprising the inductor 304 and the first capacitor 306, any low pass filter device that may remove high frequency signals but pass low frequency signals from the power supply signal may be used as the low pass filter. However, the use of a low pass filter that does not include an inductor 304 and a capacitor 306 may add additional components and cost to the control circuit 300. Also, as further described below, the inductor 304 and the first capacitor 306 may also be part of a damped resonant circuit to remove harmonics in the control circuit 300.

Also connected to the first node 316 may be one end of a second capacitor 308. The other end of the second capacitor 308 may be connected to a second node 318. The second capacitor 308 may be any electrical device that can store electrical energy, similar to the first capacitor 306 described above. As explained in more detail below, the second capacitor 308 may function to isolate the second resistor 312 and the carrier insert signal from the power supply signal.

A second resistor 312 may also be connected to the second node 318. The second resistor 312, the inductor 304 and the first capacitor 306 may form an RLC damped resonant circuit. The damped resonant circuit may remove harmonics in the circuit that are created by a control signal inputted into the circuit at the carrier insert pin. A third resistor 310 may be electrically connected in series between the second node 318 and the carrier insert pin. The control signal input at the carrier insert pin may be generated by the STB to control the LNB. For example, the STB may provide a control signal to the LNB to instruct the LNB to begin processing the incoming television signal. The control signal transmitted by the STB may be generated by a digital circuit at a transistor-transistor logic (TTL) voltage level. Thus, the control signal input on the carrier insert pin may be generated by a microprocessor or digital circuit of the STB. This control signal may be generated in the same manner as described with reference to FIG. 2. However, unlike the circuit described in FIG. 2, this embodiment may not provide for matching the control signal voltage to the power supply voltage level. Instead, because the carrier insert pin is isolated from the power supply signal, the control signal may be inputted at a TTL voltage level. Thus, the control signal may be provided by a microprocessor within the STB without additional components to increase the voltage level of the control signal.

An output pin may be electrically connected to the first node of the control circuit 300. At the output pin, the control circuit 300 may provide a combined power signal and communication signal to the LNB. The combined signals may be in a form such that the signal is capable of being transmitted to the LNB over a cable that connects the STB and the LNB. Further, the output pin may be combined with the RF signal being input into the STB tuner from the LNB.

The control circuit 300 for the LNB may be bidirectional. For example, the control circuit 300 may provide a low impedance at the output pin when data is being sent from the circuit and may have high impedance when the LNB is providing the incoming communication signal to the control circuit 300. To control the bidirectional nature of the control circuit 300, a field-effect transistor (FET) device 314 may be electrically connected in series between the second resistor 312 and ground. Generally speaking, the FET device 314 of FIG. 3 is an n-channel metal oxide semiconductor field-effect transistor, or n-channel "MOSFET." It should be noted that alternative embodiments may use a p-channel MOSFET, depletion mode MOSFET, and so on.

The FET device 314 may have four terminals, namely a gate, a drain, a source and a body. The drain terminal may be electrically connected to the second resistor 312. The body and the source terminals may be connected to ground. The gate terminal may be connected to an enable input signal. When the FET device 314 receives an enable signal, the FET may act as a switch connecting the second resistor 312 to ground. When the enable signal is removed signal from the FET device 314, the circuit becomes open at the FET device.

By opening and closing the FET device 314, the enable signal may control the bidirectional nature of the control circuit 300. For example, when data is being sent from the STB to the LNB, a low impedance at the output pin may be useful. Low impedance at the output pin may be achieved by activating the FET device 312 and connecting the second resistor 312 to ground. When the communication signal is being received from the LNB, a high input impedance may be required at the output pin. A high impedance at the output pin may be achieved when the FET device 312 is not conducting, thereby opening the circuit at the FET device.

The control of the FET device 314 may be provided by a microprocessor or similar digital circuit signal within the STB. Thus, through the microprocessor (not shown), the STB may control when the control circuit 300 transmits data and when the circuit is blocked from receiving the incoming television signal. Further, in the embodiment of FIG. 3, the enable signal provided to the FET device 314 may not require any additional circuitry to match the power supply 302 voltage. Similar to the carrier insert pin, the second resistor 312 may be isolated from the power supply 302 signal by capacitor 308. Thus, the enable signal used to control the FET device 314 may not be required to match that of the power supply 302 signal. Instead, a TTL voltage level signal may be provided by a microprocessor of the STB to switch the FET device 314 on and off. Thus, the output pin of the control circuit 300 may be switched from high impedance to low impedance. Further, the enable signal to switch the FET device 314 may be provided by a microprocessor at a TTL voltage level, without the need for a interface circuit to adjust the voltage of the enable signal. By removing the necessity of an interface circuit to adjust the voltage of the enable signal, the embodiment of FIG. 3 may lower the overall power consumption of the control circuit 300.

Another feature that the embodiment of FIG. 3 may provide is that a separate low pass filter may not be located at the output of the power supply 302. Instead, the RLC resonant circuit comprised of the inductor 304, the first capacitor 306 and the first resistor 312 may have sufficient functionality as a low pass filter for the power supply 302 signal. More specifically, the inductor 304 and the first capacitor 306 of the resonant circuit may provide a low pass filter functionality to the output of the power supply 302. The low pass filter may remove the voltage ripple that may be part of the power supply 302 signal. Thus, instead of providing a separate low pass filter at the output of the power supply 302, the RLC resonant circuit may provide the low pass functionality, without additional components in the control circuit 300.

Through the control circuit 300 of FIG. 3, a STB may provide power and control signals to an LNB. The power and control signals may be transmitted to the LNB through a cable that connects the STB and the LNB. The control signal may be provided by the STB and combined with the power signal by the control circuit 300. Further, the STB may provide an enable signal to the control circuit 300 to control the impedance of the output pin. The enable signal may provide a low impedance at the output pin when the circuit provides data to the LNB and a high impedance when the STB receives a communication signal from the LNB. Also, the embodiment may remove the low pass filter at the output of the power supply 302 by incorporating the low pass filter functionality into the RLC resonant circuit. Further, the embodiment may isolate the incoming enable signal and control signal from the power supply 302 signal such that the signals may operate at a lower voltage level, such as a TTL voltage level.

The foregoing merely illustrates the principles of various embodiments of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A control circuit comprising:

an inductor electrically connected to a first node;

a first capacitor electrically connected between the first node and ground, the first capacitor reducing switching noise of a power supply;

a second capacitor electrically connected between the first node and a second node, the second capacitor controlling a bidirectional data path by selectively presenting high or low impedance at an output pin;

a first resistor electrically connected to the second node; and a field effect transistor comprising a body terminal, a source terminal, a gate terminal and a drain terminal, wherein the drain terminal is electrically connected to the first resistor, the body terminal and the source terminal are electrically connected to ground, and the field effect transistor selectively coupling the second capacitor to ground in response to receiving a transistor-transistor level voltage enable signal at the gate terminal of the field effect transistor.

2. The control circuit of claim 1 further comprising:

an enable input pin electrically connected to the gate terminal of the field effect transistor, wherein the transistor-transistor level voltage enable signal is inputted on the enable input pin to control flow of current through the field effect transistor and thereby control the impedance level at the first node.

3. The control circuit of claim 2 further comprising:

a carrier insert pin coupled to a microprocessor; and a power input coupled to the power supply; wherein the microprocessor and the power supply are components of a set-top box.

4. The control circuit of claim 3 wherein the enable signal is transmitted to the control circuit by the microprocessor.

5. The control circuit of claim 3 wherein the control signal is inputted at the carrier insert pin and the power supply signal is inputted at the power input.

6. The control circuit of claim 5 wherein the control signal and the power signal are combined and outputted at the first node.

7. The control circuit of claim 1 further comprising:

a second resistor electrically connected to the second node.

8. An apparatus for controlling a low noise block comprising:

an RF splitter coupled to the low noise block, the RF splitter splitting a signal into a television signal and a communication signal; and a control circuit coupled to the RF splitter, the control circuit comprising:

a power signal input pin;

a control signal input pin;

an output pin;

an enable signal input pin;

a first capacitor coupled to the power signal input pin and reducing switching noise of a power supply;

a second capacitor coupled to the output pin and controlling a bidirectional data path by selectively presenting high or low impedance at the output pin; and a field effect transistor comprising a gate terminal, the field effect transistor configured to control the impedance level at the output pin by selectively coupling the second capacitor to ground in response to receiving a transistor-transistor level voltage signal at the gate terminal of the field effect transistor from the enable signal input pin;

wherein the RF splitter is coupled to the control circuit at the output pin of the control circuit.

9. The apparatus of claim 8 further comprising:

a microprocessor coupled to the control signal input pin of the control circuit, wherein the microprocessor inputs a control signal on the control signal input pin.

10. The apparatus of claim 9 further comprising:

a power supply module coupled to the power signal input pin of the control circuit, wherein the power supply module inputs a power signal on the powers signal input pin.

11. The apparatus of claim 10 wherein the microprocessor inputs an enable signal on the enable signal input pin.

12. The apparatus of claim 11 wherein a high enable signal causes a low impedance level at the output pin, the low impedance level facilitating transmission of a combined power and control signal at the output pin.

13. The apparatus of claim 11 wherein a low enable signal causes a high impedance level at the output pin, the high impedance level facilitating the receipt of a communication signal from the low noise block to the control circuit.

14. The apparatus of claim 10 wherein the power supply module is a switch mode converter power supply.

15. A method for communicating with a low noise block comprising:

inputting a power signal to a control circuit;

inputting a control signal to the control circuit;

controlling an impedance level at an output pin by selectively receiving a transistor-transistor level (TTL) enable signal at a gate terminal of a field-effect transistor device that selectively couples a capacitor to ground in response to receiving the TTL enable signal; and outputting a combined power and control signal to the low noise block.

16. The method of claim 15 further comprising:

inputting a low TTL enable signal to the base terminal of the field-effect transistor device; and receiving a communication signal from the low noise block.

17. The method of claim 15 further comprising:

attenuating high frequency signals past a cutoff frequency in the power signal.

18. The method of claim 15 wherein the control signal and the enable signal are generated by a microprocessor.

19. The method of claim 15 wherein the combined power and control signal provide power to the low noise block and control the functions of the low noise block.

* * * * *